May 26, 1970  J. M. SUDDARTH ET AL  3,514,141

UNIVERSAL JOINT

Original Filed July 1, 1964

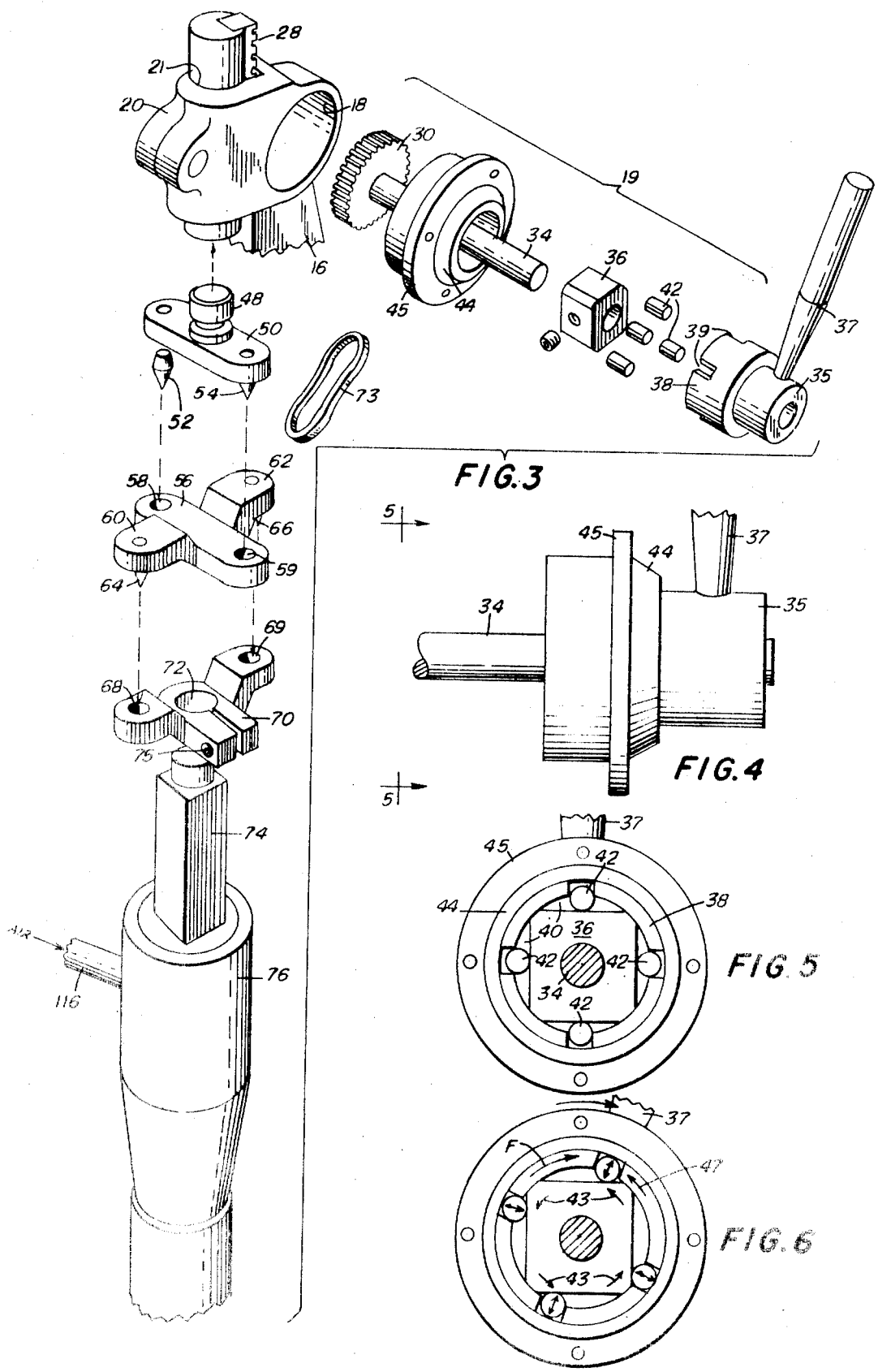

United States Patent Office 3,514,141
Patented May 26, 1970

3,514,141
UNIVERSAL JOINT
Jack M. Suddarth, Fort Gibson, and Dolph L. Gray, Muskogee, Okla., assignors to Coburn Manufacturing Company, Inc., Muskogee, Okla., a corporation of Oklahoma
Original application July 1, 1964, Ser. No. 379,509, now Patent No. 3,389,508, dated June 25, 1968. Divided and this appplication Apr. 22, 1968, Ser. No. 745,058
Int. Cl. F16d 3/10
U.S. Cl. 287—130                                                5 Claims

ABSTRACT OF THE DISCLOSURE

A universal joint for joining shafts which is subjected to radial and longitudinal thrusts comprising a top bracket attached to one shaft and a bottom bracket attached to the other and an intermediate bracket between the top and bottom brackets. The brackets cooperate to provide pivotal bearings and bearing surfaces in the same horizontal plane with the intermediate bracket providing diametrically spaced bearing surfaces for one bracket having bearings thereon and providing diametrically opposed bearing supports for cooperation with bearing surfaces on the other bracket, the bearings being equally, circumferentially spaced.

---

This application is a division of application Ser. No. 379,509, filed July 1, 1964, entitled, "Cylinder Grinder," now Pat. No. 3,389,508, issued June 25, 1968.

This invention pertains generally to improvements in lens grinding and polishing machines and, more particularly, relates to improvements in machines for polishing and fining the surfaces of cylindrical lens blanks. Machines of this type are comprised generally of a cylinder lap supported on a platform in which there is introduced an irregular movement referred to in the art as a "break-up" movement, together with means for maintaining the lens in engagement with the moving lap. The prior art is well aware of mechanisms for producing break-up movements. For instance, the United States patent to Long No. 2,159,620 and the United States patent to Lockhart No. 2,168,843 disclose structures that are illustrative of this movement. In the invention described herein, the lens blank supporting structure receives an orbiting movement over the break-up movement of the lens lap. The above movements result in a variation of movement over the lap surface for the purpose of preventing the formation of aberrataions, waves and distortions in the surface of the lens which will occur if the polishing process is not performed over the entire lap surface.

It is an object of this invention to provide a universal joint particularly adapted for lens grinding and polishing machines to permit the movement referred to above. It is to be understood that the joint of this invention is not limited to this specific use but may be applied in other environments where universal movement between two elements is desirable.

Specifically, this invention provides a universal joint between two members comprising a first bracket secured to the end of one member and normal to the longitudinal axis thereof. First and second bearings extend from the ends of the first bracket in the lower surface thereof. A mid-bracket is disposed parallel to said first bracket and has bearing surfaces in the ends thereof respectively receiving the first and second bearings. First and second transverse arms extend upwardly and outwardly from said mid-bracket, each having a lower surface coplanar with the lower surface of said first bracket. Third and fourth bearings are provided extending respectively from said lower surfaces of said first and second arms. A third bracket is positioned adjacent said mid-bracket and parallel thereto with third and fourth arms extending upwardly and outwardly from said third bracket and having mating surfaces in close parallel relationship respectively to said lower surfaces of said first and second arms. The third and fourth arms have bearing surfaces to receive the third and fourth bearings. Means are provided for fixedly securing the other member to said third bracket. Means in the form of a resilient band may be wrapped around the first and third brackets to secure the whole ensemble together. Further, the bearings may be in the form of conical pins and the bearing surfaces in the form of recesses to receive the apex of the pins in point contact.

These and other objectives and advantages of the invention will be more fully understood upon a reading of the following specification taken in view of the attached drawings wherein:

FIG. 3 is an exploded perspective of the supporting head assembly and the handle lock assembly;

FIG. 4 is an assembled side elevation of the handle lock assembly;

FIG. 5 is a cross-sectional view of the handle lock assembly along the line 5—5 of FIG. 4;

FIG. 6 is a view similar to FIG. 5 with the elements moved to their locking position;

Figure 2:
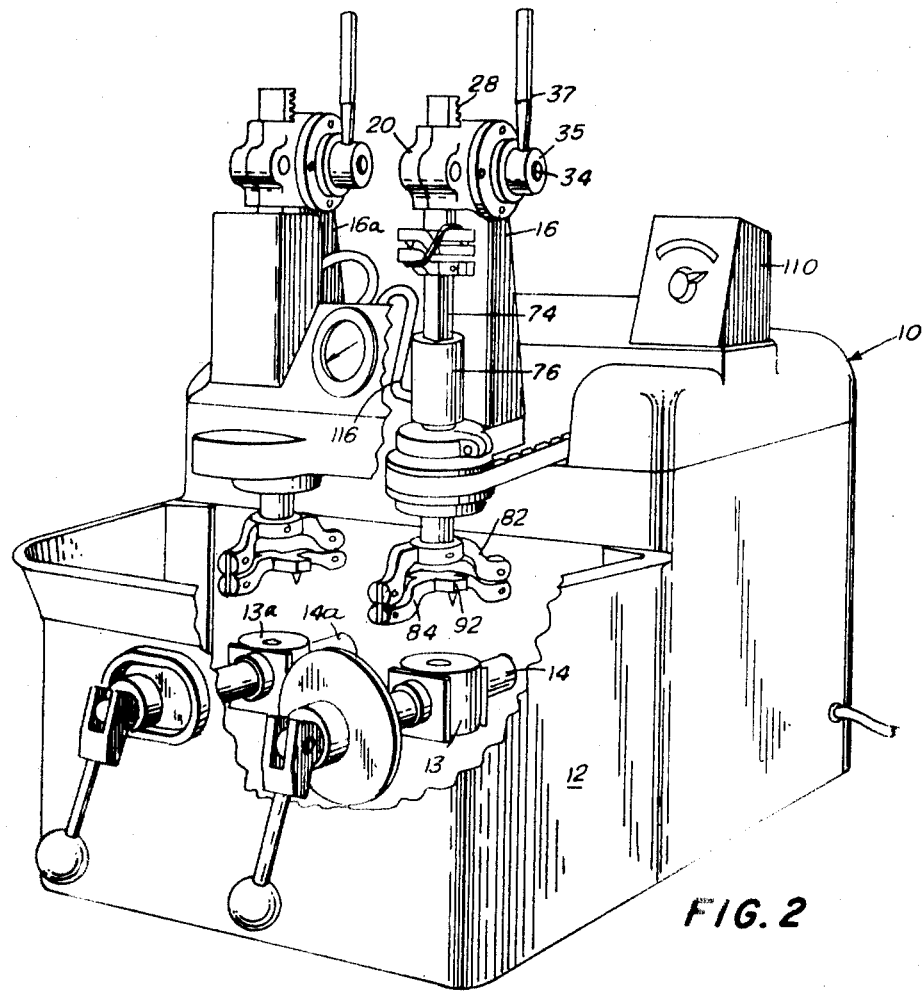
FIG. 2 is a front perspective view of the machine with portions broken away.

Referring now to the drawings wherein a preferred embodiment of the invention is disclosed, like numerals are used to indicate like elements in the several views. The numeral 10 indicates generally the housing of a lens polishing machine. Attached to the front of the housing is a polishing bowl 12. The bowl is suitably equipped with means to provide a grinding slurry to the polishing area but these particular means form no part of the present invention.

Figure 1:
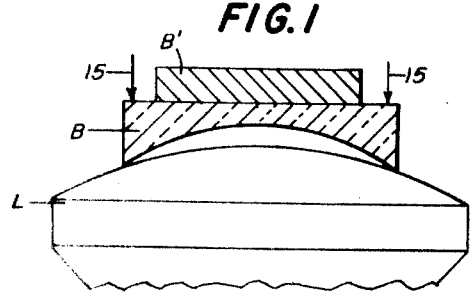
FIG. 1 is a diagrammatic (somewhat exaggerated) view of the lens and lap prior to polishing.

The actual polishing and finishing of the lens takes place within the bowl 12. Disposed within the bowl are a pair of lap supports 13 and 13a to which a pair of laps L are mounted. A brief referral to FIG. 1 will disclose that prior to finishing a lens blank B, only the edge portions of the blank engage the cylinder lap. When a downward pressure is exerted on the blank, lines of stress develop generally along the arrows 15. This invention is directed primarily to a means for automatically maintaining the pressures at a reduced level until the lines of stress are dispersed due to an initial removal of glass from the edges of the blank.

A breakup motion of the type heretofore described is imparted to the members 13 and 13a via the shafts 14 and 14a. At their outer ends the shafts are provided with handles and diaphragms for sealing the bowl apertures through which they extend. This last-mentioned arrangement facilitates removing the bowl when desired. It should be understood that the breakup movement occurs in a common plane without any rotational movement being transmitted to the laps.

Extending upwardly and somewhat forwardly of the housing 10 are a pair of standards 16 and 16a. Since the apparatus supported by standard 16 and all structure associated therewith is identical to that supported by 16a, only the standard 16 will be discussed in any detail. At its uppermost end, the standard 16 is horizontally journaled at 18 to receive the handle locking assembly 19 which is described in detail hereinafter. Forward of the journal is a bracket 20 having a vertical slideway 21 therethrough. Slidably received within the way 21 is the upper end of a lens blank supporting and driving assembly 26.

The drive assembly is supported by a rack 28 which is slidably received in slideway 21. The rack 28 is raised and lowered within the way via a pinion 30 which is operably connected to the handle lock assembly 19. The rack and pinion are utilized to raise and lower the drive head assembly with respect to the lap L. A suitable opening between the journal 18 and the slideway 21 permits the pinion to mesh with the rack.

The handle assembly 19 is effective to maintain the rack 28 at a fixed height regardless of longitudinal forces acting longitudinally upwardly thereof. In this respect, the handle assembly is a one-way clutch. The handle lock assembly includes a shaft 34, the inner end of which supports the pinion 30 and the outer end of which is rotatably received in a bushing 35. Fixedly secured intermediate the rod end is a four-sided cam 36. The cam is receivable in a cylinder-like member 38 which extends inwardly of bushing 35. The interior diameter of member 38 is only slightly greater than the diagonal length of cam 36.

The cylinder 38 is formed with a plurality of slots 39. A plastic body 44 encompasses the cylinder and forms with the cam 36 and slots 39 a series of chord-like chambers 40, each of which houses a pin 42. The body 44 is provided with an outer flange 45 which is secured to standard 16 by screws or the like.

An understanding of the handle lock assembly can best be had by referring to FIGS. 4, 5 and 6. As previously described, the member 44 is fixed to the standard, and the shaft 34, cam 36 and pinion 30 rotate as a unit. The outer end of shaft 34 is rotatably secured in the handle unit consisting of cylinder 44, bushing 35, and handle 37. Therefore, as the cylinder 44 is rotated counterclockwise (clockwise as viewed in FIGS. 5 and 6) under the influence of the handle 37, the rack 28 is lowered toward the lens and lap.

Prior to the rotational movement in handle 37 acting on pinion 30, a certain amount of free-play occurs between the cylinder 44 and the cam 36. For purposes of description, the location of elements as viewed in FIG. 5 can be termed a neutral position. As the cylinder 38 is rotated, the pins 42 receive a lateral or circumferential force along arrow F wedging them into the narrow portion of their respective chordal chambers 40, as seen in FIG. 6. When resistance is met and the pins bind between the sides of cam 36 and the interior of member 44, the shaft 30 will then rotate with the handle whereby the head assembly is lowered.

Thereafter, forces attempting to lift rack 28 will transmit a rotational force in shaft 34 which acts generally along the force lines 43 of FIG. 6. Such forces are dissipated in further compressing the pins rather than rotating the cylinder. When it is desired to lift the rack, the handle 37 is moved in the opposite direction, creating circumferential forces 47 which readily dislodge the pins. The rack begins an upward movement when the pins bind at the opposite narrow portions of chambers 40.

As previously mentioned, the rack 28 supports the drive assembly 26. The lowermost end of the rack is formed with a pocket which receives the upper end of stub shaft 48. The shaft is fixedly secured to the pocket by set screws or the like. A joint 49 consisting of three brackets is formed between the rack and the assembly 26. The lower end of the shaft is formed with a bracket member 50. Downwardly depending from each end of the bracket are a set of conical bearings 52 and 54. Disposed immediately below the bracket 50 is second bracket 56 having sockets 58 and 59 for respectively receiving the bearings 52 and 54. A pair of arms 60 and 62 extend outwardly and upwardly from the midportion of bracket 56 as best seen in FIG. 3. Depending downwardly from the outer ends of arms 60 and 62 is a second set of conical bearings 64 and 66 which are receivable respectively in sockets 68 and 69 of a third bracket 70. The bracket 70 is provided with an opening 72 to removably receive the upper end of a lower shaft 74. The bracket 70 is tightened about the shaft 74 via a bolt 75. The brackets 50, 56 and 70 form a suspension joint 71 for purposes described hereinafter. The brackets are held in engagement with one another by an endless resilient band 73 having one end looped under one end of bracket 70 across the upper surface of bracket 50 and below the end of arm 70.

The lower end of shaft 74 forms the upper end of a pneumatic cylinder 76. Slidably received in cylinder 76 is a piston 78 having a piston rod 80 extending downwardly through the other end of the cylinder. Fixedly secured to the bottom of rod 80 is a yoke 82. The yoke carries a rocker 84 which is pivotally suspended therefrom by linkage arms 88 and 90. The rocker carries a transverse crossbar 92 having pins 94 which are adapted for driving engagement with the conventional recesses of the lens block B.

Figure 7:
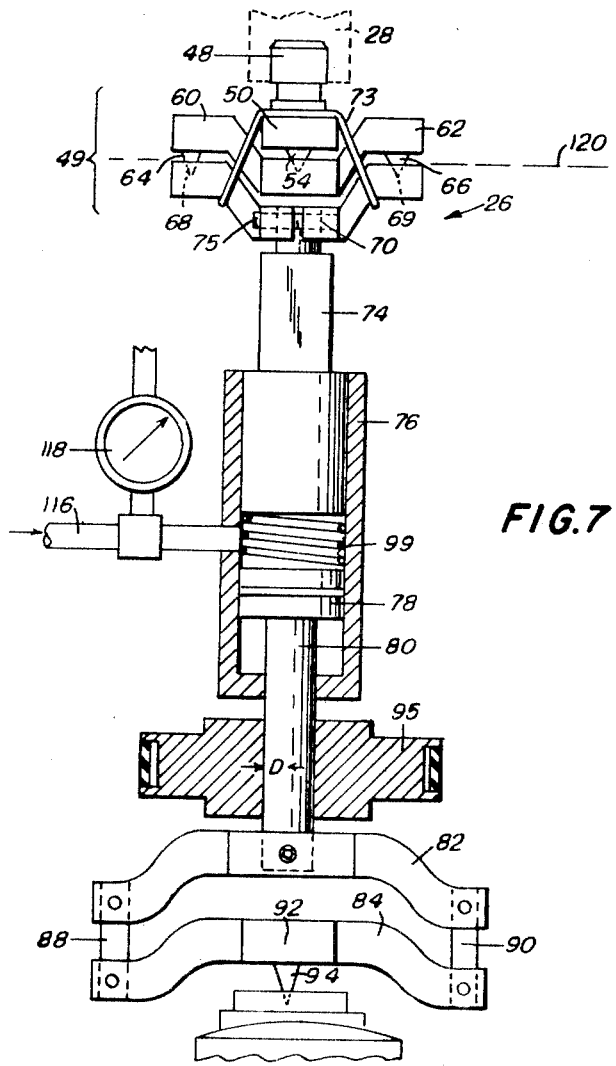
FIG. 7 is an assembled view of the supporting head assembly of FIG. 3.

Intermediate the length of rod 80 is a circular sheave-like member 95. As seen best in FIG. 7, the rod is offset from the center of the sheave an amount D for causing the rod to travel a circular path as the sheave is rotated. A strap 98 engages the sheave 96 and also engages apparatus in housing 10 for transmitting the continuous orbital or circular movement to the head. The orbital movement, of course, must be limited in diameter so that the lens will always be within the periphery defined by the breakup movement.

Figure 8:
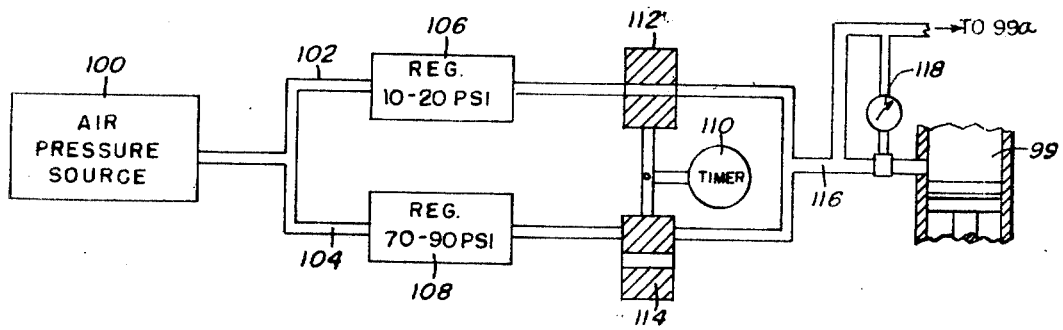
FIG. 8 is a schematic of the fluid pressure and timing valve apparatus.

The expansion chamber 99 of the cylinder 76 is pressurized via a source of pressurized air 100. A schematic of the pneumatic and timing valves is shown in FIG. 8. The source of pressurized air is divided into two branches by conduits 102 and 104. Across conduit 102 is placed a pressure regulator 106 and across conduit 104 is placed a pressure regulator 108. The regulators are of an adjustable type and desirably the regulator 106 is set at approximately 10–20 p.s.i. and regulator 108 at from 70–90 p.s.i.

A timing apparatus 110 of a conventional reset type is connected to operate the solonized air valves 112 and 114 which are respectively placed across conduits 102 and 104. For the first several minutes of operation, the timer is set to open the valve 112 to permit the lower regulated pressure in line 102 to be communicated to line 116 and chamber 99 and, threafter, close valve 112 and open line 116 and chamber 99 to the higher pressure by opening valve 114. A pressure indicator dial 118 is placed across conduit 116 for informative reasons.

In operation, an attendant first places a lap of the desired cylindrical configuration on the supports 13 and 13a. Thereafter, a blocked lens blank B is centrally placed over the lap. While holding the lens in position with one hand, the attendant grasps handle 37 with the other to lower the head assembly 28 until pins 94 engage the appropriate recesses formed in the rear of the lens block. As has previously been described, insofar as movement longitudinal of member 28 is concerned, only that movement transmitted through handle 37 can now affect the raising or lowering of the upper portion of the head assembly.

Upon turning the timer to its start position, pressure is applied into chamber 99 via the low pressure regulator 106 and conduit 102. Once chamber 99 is pressurized, the force maintaining the lens into engagement with the lap is solely determined by the pressure regulators and not handle 37. As has been previously mentioned, the initial low pressure is regulated by member 106 and is maintained on the lens for a period of approximately five minutes. Thereafter, the timer automatically communicates the higher pressure regulated by regulator 108 to chamber 99 until final polishing is accomplished. During the period that pressure is applied and the lap support members are receiving the breakup movement, the head 26 is orbited due to the rotation of sheave 95.

The importance of the joint 49 can now be readily understood. As the head is orbited, but not rotated since rod 80 is not fixed rotationally with sheave 95, the rack 28 stays stationary and the rest of the head assembly is pivotal at joint 49. The pivoting movement occurs in a plane 120 which intersects each of the pivot points at pins 64, 66, 52 and 54. In other words, a four point suspension in a common plane is available which is readily disconnected by removing the resilient band 73. The joint is of a type uniquely adapted to take the longitudinal thrusts which are transmitted by the pressure apparatus and the radial thrusts which are transmitted by the orbiting apparatus.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

What is claimed is:

1. A joint between a stationary member and a drive member which is subjected to longitudinal and radial thrusts comprising a first bracket secured to the end of said stationary member and normal to the longitudinal axis thereof, first and second bearings extending from the ends of said bracket and the lower surface thereof, a mid-bracket disposed parallel to said first bracket and having bearing surfaces in the ends thereof respectively receiving said first and second bearings, first and second transverse arms extending upwardly and outwardly from said mid-bracket and each having a lower surface co-planar with the lower surface of said first bracket, third and fourth bearings extending respectively from said lower surfaces of said first and second arms, a third bracket adjacent to said mid-bracket and parallel thereto, third and fourth arms extending upwardly and outwardly from said third bracket and having mating surfaces in close parallel relationship respectively to said lower surfaces of said first and second arms, said third and fourth arms having bearing surfaces to receive said third and fourth bearings, and means fixedly securing said drive member to said third bracket.

2. A joint as defined in claim 1 and including means for securing said first, mid and third brackets in engagement with each other.

3. A joint as defined in claim 2 and wherein said means for securing said brackets in engagement with each other is a resilient band encompassing the brackets.

4. A joint as defined in claim 1 wherein said first, second, third and fourth bearings are each conical and the apex of each conical bearing makes point contact with its respective bearing surface.

5. A joint as defined in claim 4 wherein said bearing surfaces are defined by recesses in the brackets for receiving the apexes of said conical bearings.

References Cited

UNITED STATES PATENTS

| 766,482 | 8/1904 | Wolfe | 51—124 |
|---|---|---|---|
| 1,230,530 | 6/1917 | Stead | 51—133 |
| 3,024,627 | 3/1962 | Karas | 64—10 |
| 3,173,700 | 3/1965 | Klukos | 64—10 X |
| 3,389,508 | 6/1968 | Suddarth et al. | 51—60 |

FOREIGN PATENTS

| 24,820 | 6/1922 | France. |
|---|---|---|

DAVID J. WILLIAMOWSKY, Primary Examiner

A. V. KUNDRAT, Assistant Examiner

U.S. Cl. X.R.

287—86; 308—2